United States Patent
Makino

(10) Patent No.: US 10,259,379 B2
(45) Date of Patent: Apr. 16, 2019

(54) VEHICLE LAMP

(71) Applicant: Koito Manufacturing Co., Ltd., Tokyo (JP)

(72) Inventor: Hiroyuki Makino, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/014,113

(22) Filed: Jun. 21, 2018

(65) Prior Publication Data
US 2019/0001864 A1 Jan. 3, 2019

(30) Foreign Application Priority Data

Jun. 30, 2017 (JP) .................. 2017-128410

(51) Int. Cl.
*B60Q 1/00* (2006.01)
*F21V 7/06* (2006.01)
*F21S 41/32* (2018.01)

(52) U.S. Cl.
CPC ............ *B60Q 1/0088* (2013.01); *F21S 41/32* (2018.01); *F21V 7/06* (2013.01)

(58) Field of Classification Search
CPC ........... B60Q 1/0088; F21S 41/32; F21V 7/06

USPC .......................................... 315/82
See application file for complete search history.

(56) References Cited

U.S. PATENT DOCUMENTS

| 2014/0355286 A1* | 12/2014 | Arita ................ F21S 41/19 362/516 |
| 2016/0281950 A1* | 9/2016 | Sato .................. B60Q 1/0041 |
| 2017/0138555 A1* | 5/2017 | Hirasawa ............ B60Q 1/14 |

FOREIGN PATENT DOCUMENTS

JP 2015-130293 A 7/2015

* cited by examiner

*Primary Examiner* — Daniel D Chang
(74) *Attorney, Agent, or Firm* — Abelman, Frayne & Schwab

(57) ABSTRACT

A vehicle lamp includes a first light source, a second light source, a first reflector configured to reflect light from the first light source toward the front of the lamp, a second reflector configured to reflect light from the second light source toward the front of the lamp, and a first shade configured to shield at least a part of direct light directed from the first light source to the outside of the lamp. The first shade includes a reflecting surface configured to reflect the light from the second light source toward the front of the lamp.

15 Claims, 6 Drawing Sheets

VEHICLE LAMP

CROSS-REFERENCE TO RELATED APPLICATIONS

This application is based on and claims priority from Japanese Patent Application No. 2017-128410 filed on Jun. 30, 2017 with the Japan Patent Office, the disclosure of which is incorporated herein in its entirety by reference.

TECHNICAL FIELD

The present disclosure relates to a vehicle lamp.

BACKGROUND

There is known a vehicle lamp, which includes a shade for shielding at least a part of direct light directed from a light source to the outside of the lamp in order to prevent the direct light directed to the outside of the lamp from giving glare to, for example, a pedestrian or a driver of an oncoming vehicle. See, for example, Japanese Patent Laid-Open Publication No. 2015-130293.

SUMMARY

A vehicle lamp may be configured to effectively utilize light emitted from a light source.

The present disclosure has been made in view of such circumstances, and provides a vehicle lamp capable of improving the utilization efficiency of light from a light source.

According to one aspect of the present disclosure, a vehicle lamp includes a first light source, a second light source, a first reflector configured to reflect light from the first light source toward a front of the lamp, a second reflector configured to reflect light from the second light source toward the front of the lamp, and a first shade configured to shield at least a part of direct light directed from the first light source to an outside of the lamp. The first shade includes a reflecting surface configured to reflect the light from the second light source toward the front of the lamp.

In addition, it should be noted that arbitrary combinations of the above constituent elements, or mutual substitution of constituent elements and expressions of the present disclosure among, for example, methods, apparatuses, and systems are also effective as aspects of the present disclosure.

According to the present disclosure, it is possible to improve the utilization efficiency of light from a light source.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF EMBODIMENT

Figure 1:
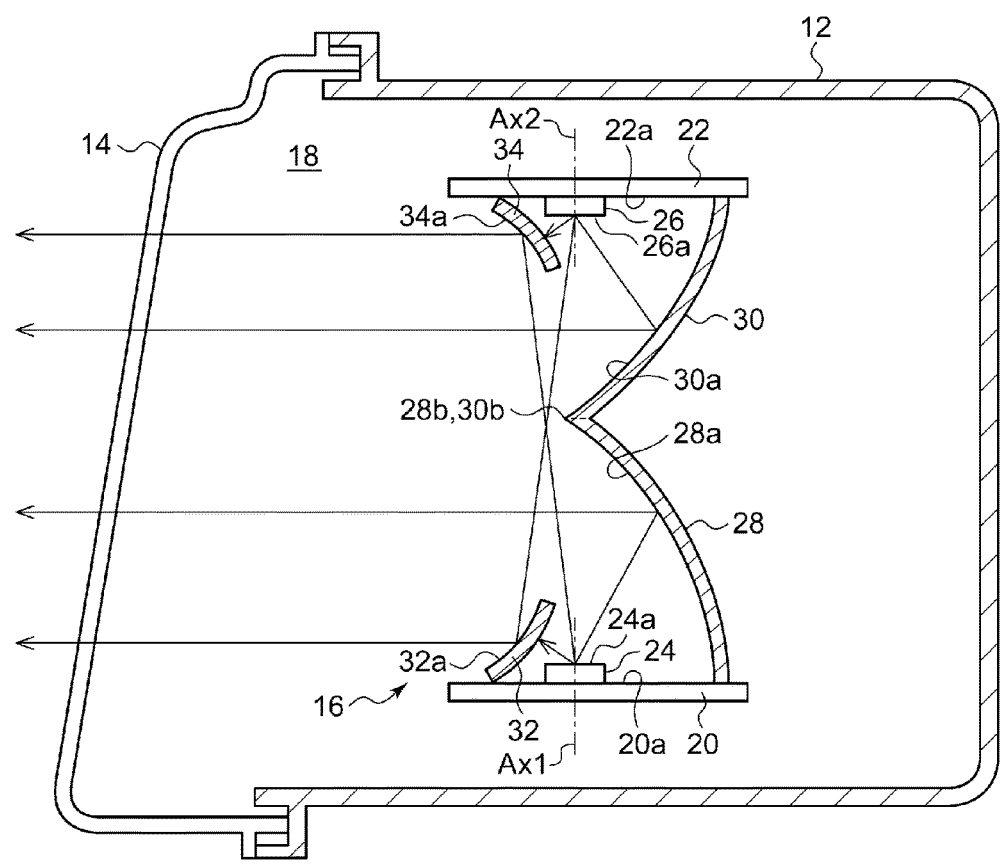
FIG. 1 is a vertical cross-sectional view illustrating a schematic structure of a vehicle lamp according to an exemplary embodiment.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, the present disclosure will be described with reference to the drawings based on an appropriate exemplary embodiment. The same reference numerals will be given to the same or equivalent constituent elements, members, and processings illustrated in the respective drawings, and redundant descriptions thereof will be appropriately omitted. In addition, the exemplary embodiment is not intended to limit the disclosure, but is given by way of example, and all features or combinations thereof described in the exemplary embodiment may not be necessarily to the disclosure. In addition, in the present specification, when terms indicating directions such as, for example, "upper", "lower", "front", "rear", "left", and "right" are used, these terms mean the directions in a posture when a vehicle lamp is mounted on a vehicle.

FIG. 1 is a vertical cross-sectional view illustrating a schematic structure of a vehicle lamp 10 according to an exemplary embodiment. The vehicle lamp 10 is disposed on each of left and right sides of a front portion of a vehicle. The vehicle lamp 10 includes a lamp body 12, a light-transmitting cover 14, and a lamp unit 16.

The lamp body 12 is formed in a box shape having an opening. The light-transmitting cover 14 is provided on the lamp body 12 so as to cover the opening in the lamp body 12. The lamp unit 16 is disposed in a lamp chamber 18, which is defined by the lamp body 12 and the light-transmitting cover 14.

The lamp unit 16 includes a first circuit board 20, a second circuit board 22, a first light source 24, a second light source 26, a first reflector 28, a second reflector 30, a first shade 32, and a second shade 34.

The first circuit board 20 is disposed in the lamp chamber such that two main surfaces thereof approximately face upward and downward, respectively. A circuit pattern for supplying electric power to the first light source 24 is formed on the main surface of the first circuit board 20, which approximately faces upward, that is, an upper surface 20a of the first circuit board 20.

Similarly to the first circuit board 20, the second circuit board 22 is disposed in the lamp chamber such that two main surfaces thereof approximately face upward and downward, respectively. In particular, the second circuit board 22 is disposed above the first circuit board 20. A circuit pattern for supplying electric power to the second light source 26 is formed on the main surface of the second circuit board 22, which approximately faces downward, that is, a lower surface 22a of the second circuit board 22.

The first light source 24 is an LED. In addition, the first light source 24 may be, for example, a semiconductor light emitting element, other than an LED, such as, for example, a laser diode (LD) or an organic or inorganic electroluminescence (EL), a discharge lamp (discharge bulb), an incandescent lamp, or a halogen lamp. The first light source 24 is mounted on the upper surface 20a of the first circuit board 20 such that a light exit surface 24a thereof faces upward and an optical axis thereof substantially coincides with the vertical direction. The first light source 24 receives electric power supplied from the first circuit board 20 to emit light.

The second light source 26 is configured similarly to the first light source 24. The second light source 26 is mounted on the lower surface 22a of the second circuit board 22 such that a light exit surface 26a thereof faces downward and an optical axis thereof substantially coincides with the vertical direction, that is, such that the optical axis thereof is substantially parallel to the optical axis of the first light source 24. In the present exemplary embodiment, the second light source 26 faces the first light source 24 in the vertical direction, and the optical axis Ax2 thereof is parallel to the optical axis Ax1 of the first light source 24. The second light source 26 receives electric power supplied from the second circuit board 22 to emit light.

The first reflector 28 includes a reflecting surface 28a. The entirety or a most part of the reflecting surface 28a is located above the light exit surface 24a of the first light source 24. In the present exemplary embodiment, the reflecting surface 28a has a rotational paraboloid shape. The first reflector 28 is disposed such that the rotation center axis of the rotational paraboloid is oriented in the longitudinal direction of the lamp. The first light source 24 is disposed at the focal position of the reflecting surface 28a. The reflecting surface 28a reflects the light from the first light source 24 in a direction parallel to the rotation center axis of the rotational paraboloid of the reflecting surface 28a (i.e., in the longitudinal direction of the lamp).

The second reflector 30 includes a reflecting surface 30a. The entirety or a most part of the reflecting surface 30a is located below the light exit surface 26a of the second light source 26. Similarly to the reflecting surface 28a of the first reflector 28, the reflecting surface 30a has a rotational paraboloid shape. The second reflector 30 is disposed such that the rotation center axis of the rotational paraboloid is oriented in the longitudinal direction of the lamp. The second light source 26 is disposed at the focal position of the reflecting surface 30a. The reflecting surface 30a reflects the light from the second light source 26 in a direction parallel to the rotation center axis of the rotational paraboloid of the reflecting surface 30a (i.e., in the longitudinal direction of the lamp).

The first reflector 28 and the second reflector 30 are formed so as not to protrude to the lamp front side from the first light source 24 and the second light source 26, respectively. In an example illustrated in FIG. 1, positions of a front end portion 28b of the first reflector 28 and a front end portion 30b of the second reflector 30 in the longitudinal direction of the lamp are within the range of an area in which the first light source 24 and the second light source 26 are present in the longitudinal direction of the lamp. In addition, the front end portion 28b of the first reflector 28 and the front end portion 30b of the second reflector 30 may be located closer to the lamp rear side than the first light source 24 and the second light source 26. In addition, the front end portion 28b of the first reflector 28 and the front end portion 30b of the second reflector 30 are connected to each other.

The first shade 32 is disposed on the lamp front side of the first light source 24. The first shade 32 shields at least a part of the light from the first light source 24, which is not incident on the reflecting surface 28a of the first reflector 28, that is, which is not subjected to light distribution control, but is directly directed to the outside of the lamp. Thereby, it is possible to prevent the light from giving glare to, for example, a pedestrian or a driver of an oncoming vehicle.

The first shade 32 includes a reflecting surface 32a on the lamp front side thereof. The reflecting surface 32a reflects at least a part of the light emitted from the second light source 26, which is not incident on either the second reflector 30 or the second shade 34, toward the lamp front side. In the present exemplary embodiment, the reflecting surface 32a reflects the light in a direction which is substantially the same as the light from the first light source 24 reflected by the reflecting surface 28a of the first reflector 28. Specifically, the reflecting surface 32a is formed in a rotational paraboloid shape. The rotation center axis of the rotational paraboloid substantially coincides with the longitudinal direction of the lamp. The reflecting surface 32a is formed such that a focal point thereof is located at or near the second light source 26.

The second shade 34 is disposed on the lamp front side of the second light source 26. The second shade 34 shields at least a part of the light from the second light source 26, which is not incident on the reflecting surface 30a of the second reflector 30, that is, which is not subjected to light distribution control, but is directly directed to the outside of the lamp. Thereby, it is possible to prevent the light from giving glare to, for example, a pedestrian or a driver of an oncoming vehicle.

The second shade 34 includes a reflecting surface 34a on the lamp front side thereof. The reflecting surface 34a reflects at least a part of the light emitted from the first light source 24, which is not incident on either the first reflector 28 or the first shade 32, toward the front of the lamp. In the present exemplary embodiment, the reflecting surface 34a reflects the light in a direction which is substantially the same as the light from the second light source 26 reflected by the reflecting surface 30a of the second reflector 30. Specifically, the reflecting surface 34a is formed in a rotational paraboloid shape. The rotation center axis of the rotational paraboloid substantially coincides with the longitudinal direction of the lamp. The reflecting surface 34a is formed such that a focal point thereof is located at or near the first light source 24.

Figure 2:
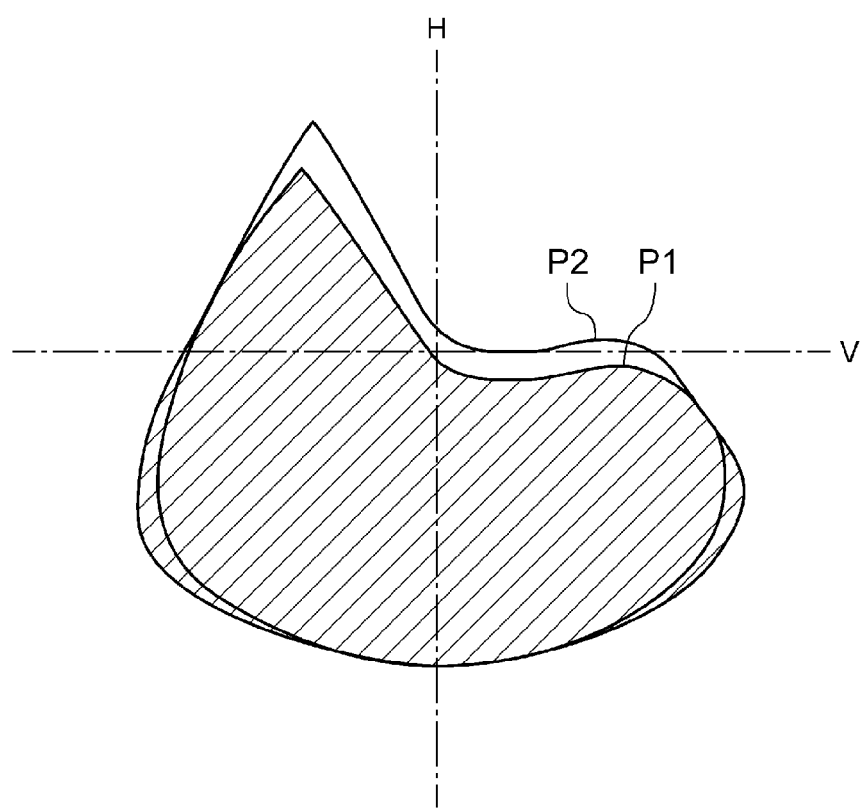
FIG. 2 is a view illustrating light distribution patterns formed by the vehicle lamp of FIG. 1.

FIG. 2 illustrates light distribution patterns formed by the vehicle lamp 10. A light distribution pattern P1 is a combined light distribution pattern in which the light reflected toward the front of the lamp by the first reflector 28 and the light reflected toward the front of the lamp by the second reflector 30 are superimposed. A light distribution pattern P2 is a combined light distribution pattern in which the light reflected toward the front of the lamp by the first shade 32 and the light reflected toward the front of the lamp by the second shade 34 are superimposed. As apparent from FIG. 2, when the first shade 32 and the second shade 34 include the reflecting surface 32a and the reflecting surface 34a, respectively, a combined light distribution pattern in which the light distribution pattern P2 is further superimposed on the light distribution pattern P1 is formed.

According to the vehicle lamp 10 of the exemplary embodiment described above, at least a part of the light emitted from the second light source 26, which is not incident on either the second reflector 30 or the second shade 34, is reflected toward the front of the lamp by the reflecting surface 32a of the first shade 32. In addition, at least a part of the light emitted from the first light source 24, which is not incident on either the first reflector 28 or the first shade 32, is reflected toward the front of the lamp by the reflecting surface 34a of the second shade 34. Thus, according to the vehicle lamp 10 of the exemplary embodiment, the utilization efficiency of light from the light source is improved.

In addition, according to the vehicle lamp 10 of the exemplary embodiment, the reflecting surface 32a of the first shade 32 reflects a part of the light from the second light source 26 in a direction which is substantially the same as the light from the first light source 24 reflected by the first reflector 28. In addition, the reflecting surface 34a of the second shade 34 reflects a part of the light from the first light source 24 in a direction which is substantially the same as the light from the second light source 26 reflected by the second reflector 30. That is, according to the vehicle lamp 10, it is possible to form a combined light distribution pattern in which the reflected light from the first reflector 28 or the second reflector 30 and the reflected light from the first shade 32 or the second shade 34 are superimposed. Therefore, according to the vehicle lamp 10, the light distribution performance may be improved as compared with a case where the first shade 32 or the second shade 34 has no reflecting surface, or the same degree of light distribution performance as that in a case where the first shade 32 or the second shade 34 has no reflecting surface may be realized with lower power consumption.

In addition, according to the vehicle lamp 10 of the exemplary embodiment, it is possible to reduce the dimension of the lamp unit 16 in the vertical direction, that is, the dimension of the vehicle lamp 10 in the vertical direction while maintaining a relatively high utilization efficiency of light from the light source. This effect will be explained with reference to FIGS. 3A and 3B.

Figure 3A:
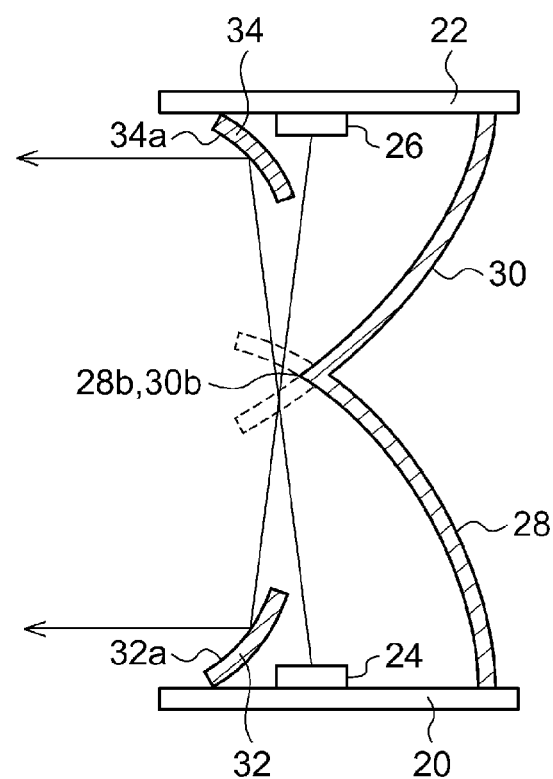
FIGS. 3A and 3B are views for explaining an effect obtained by the vehicle lamp of FIG. 1.
Figure 3B:
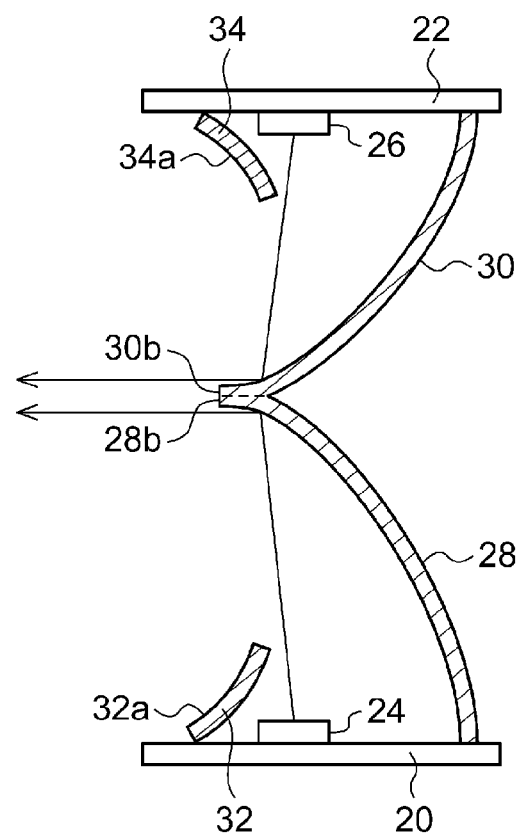

FIG. 3A illustrates the lamp unit 16 according to the exemplary embodiment, and FIG. 3B illustrates a lamp unit 160 according to a comparative example. In the lamp unit 160 according to the comparative example illustrated in FIG. 3B, the first reflector 28 and the second reflector 30 protrude to the lamp front side from the first light source 24 and the second light source 26, respectively, and thus, the reflecting surface 28a of the first reflector 28 and the reflecting surface 30a of the second reflector 30 also protrude to the lamp front side from the first light source 24 and the second light source 26, respectively. Therefore, in the lamp unit 160 according to the comparative example, the first reflector 28 and the second reflector 30 may receive a relatively large amount of light from the first light source 24 and the second light source 26.

Here, a case where the dimension of the lamp unit 160 in the vertical direction is reduced will be considered. In this case, since it is impossible to reduce the dimension of the lamp unit 160 in the vertical direction while maintaining the shapes of the first reflector 28 and the second reflector 30, the dimensions of the first reflector 28 and the second reflector 30 in the longitudinal direction of the lamp may be necessary to be reduced, and the front end portion 28b of the first reflector 28 and the front end portion 30b of the second reflector 30 may be necessary to be located closer to the lamp rear side. That is, when attempting to reduce the dimension of the lamp unit 160 in the vertical direction, the lamp unit 16 of FIG. 3A is obtained.

In the lamp unit 16 of FIG. 3A, the light from the first light source 24 and the second light source 26 is not received by the first reflector 28 and the second reflector 30 by the amount by which the dimensions of the first reflector 28 and the second reflector 30 in the longitudinal direction of the lamp are reduced, but the light may be received by the reflecting surfaces of the first shade 32 and the second shade 34. Therefore, a relatively high utilization efficiency of light from the first light source 24 and the second light source 26 may be maintained. That is, according to the vehicle lamp 10 of the exemplary embodiment, it is possible to reduce the dimension of the lamp unit 16 in the vertical direction while maintaining a relatively high utilization efficiency of light from the light source.

The configuration and operation of the vehicle lamp according to the exemplary embodiment have been described above. It is to be understood by those skilled in the art that the exemplary embodiment is given by way of example and various modifications for combinations of these constituent elements are possible and that such modifications are also within the scope of the present disclosure.

(First Modification)

In the exemplary embodiment, a case where the vehicle lamp 10 includes one lamp unit 16 has been described, but the disclosure is not limited thereto, and the vehicle lamp 10 may include two or more lamp units 16. For example, the vehicle lamp 10 may include two or more lamp unit 16 arranged parallel to each other in the transverse direction. In this case, the respective lamp units 16 may have a common first circuit board 20. That is, the first light sources 24 of the respective lamp units 16 may be mounted on one first circuit board 20, which is elongated in the vehicle width direction. Similarly, the lamp units 16 may have a common second circuit board 22. That is, the second light sources 26 of the respective lamp units 16 may be mounted on one second circuit board 22, which is elongated in the vehicle width direction.

(Second Modification)

In the exemplary embodiment and the modification described above, a case where the reflecting surfaces of the respective shades reflect light in a direction which is substantially the same as the light reflected by the respective reflectors has been described, but the disclosure is not limited thereto, and the reflecting surfaces may reflect light in different directions. For example, in FIG. 1, the reflecting surface 32a of the first shade 32 may be formed so as to reflect at least a part of the light emitted from the second light source 26, which is not incident on either the second reflector 30 or the second shade 34, to the front and upper side of the lamp, so that the reflected light forms a light distribution pattern for an overhead sign (mark above the head).

(Third Modification)

In the embodiment and the modifications described above, a case where the light exit surface 24a of the first light source 24 and the light exit surface 26a of the second light source 26 are oriented in the vertical direction, that is, where the optical axis Ax1 of the first light source 24 and the optical axis Ax2 of the second light source 26 coincide with the vertical direction has been described, but the disclosure is not limited thereto. For example, the lamp unit 16 may be configured such that the light exit surface 24a of the first light source 24 and the light exit surface 26a of the second light source 26 face the vehicle width direction (i.e., the horizontal direction). In this case, with respect to the description of the lamp unit 16, the upper and lower sides thereof may be replaced with the left and right sides thereof, respectively.

(Fourth Modification)

Figure 4:
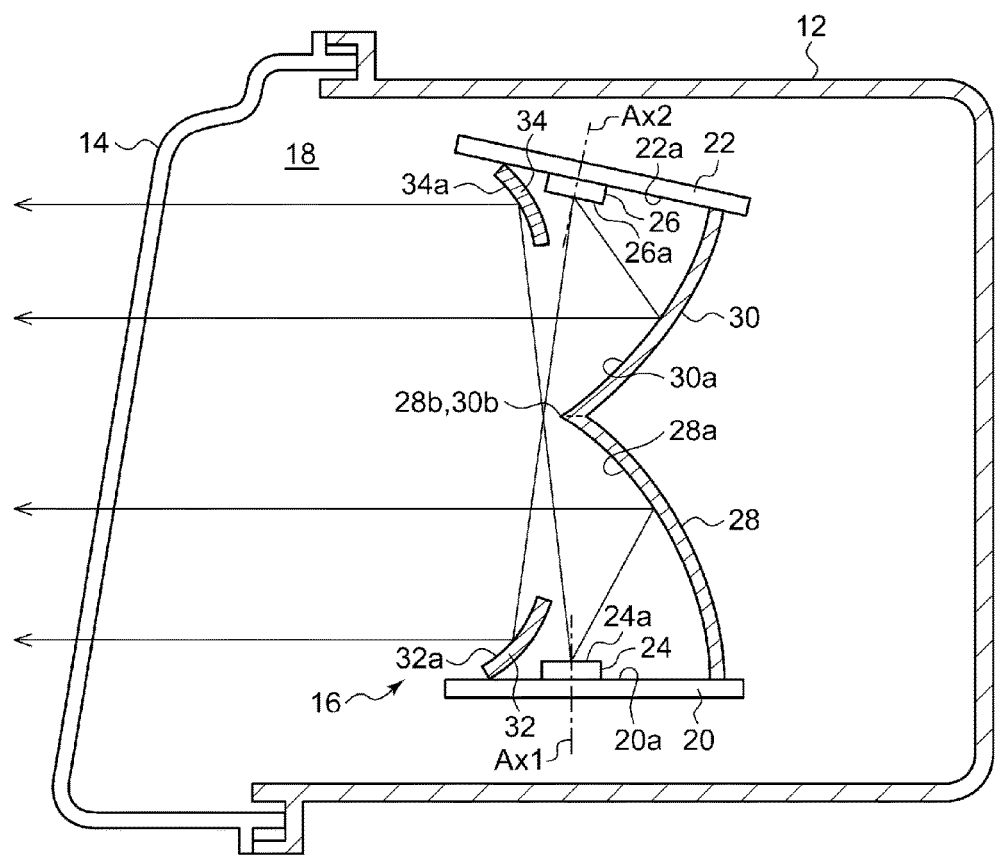
FIG. 4 is a vertical cross-sectional view illustrating a schematic structure of a vehicle lamp according to a modification.

In the embodiment and the modification described above, a case where both the optical axis Ax1 of the first light source 24 and the optical axis Ax2 of the second light source 26 are oriented in the vertical direction, that is, where the optical axis Ax1 of the first light source 24 and the optical axis Ax2 of the second light source 26 are substantially parallel to each other has been described, but the disclosure is not limited thereto, and the lamp unit 16 may be configured such that the optical axis Ax1 of the first light source 24 and the optical axis Ax2 of the second light source 26 are not parallel to each other. FIG. 4 is a vertical cross-sectional view illustrating a schematic structure of the vehicle lamp 10 according to a modification. FIG. 4 corresponds to FIG. 1. In the present modification, the first light source 24 is disposed such that the optical axis Ax1 thereof coincides with the vertical direction, and the second light source 26 is disposed such that the optical axis Ax2 thereof is inclined relative to the vertical direction.

(Fifth Modification)

Figure 5:
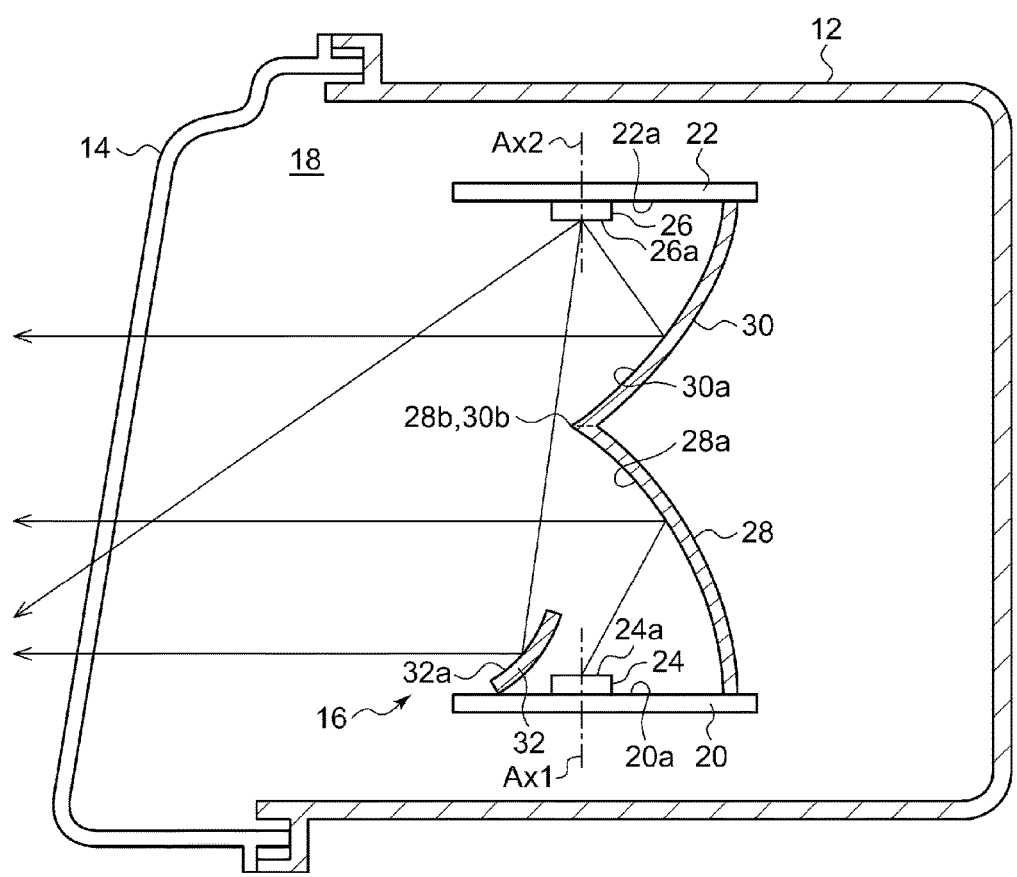
FIG. 5 is a vertical cross-sectional view illustrating a schematic structure of a vehicle lamp according to another modification.

In the embodiment and the modifications described above, a case where the vehicle lamp 10 includes the shades, which are the same in number as the light sources and the reflectors has been described, but the disclosure is not limited thereto, and the vehicle lamp 10 may include a smaller number of shades than that of the light sources and the reflectors. FIG. 5 is a vertical cross-sectional view illustrating a schematic structure of the vehicle lamp 10 according to another modification. FIG. 5 corresponds to FIG. 1. In the present modification, the vehicle lamp 10 does not include the second shade 34. In this case, since the light from the second light source 26 may be emitted directly to the outside of the lamp, but since the light from the second light source 26 is directed downward, i.e., toward the ground, the light does not give glare to, for example, a pedestrian or a driver of an oncoming vehicle.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a first light source;
   a second light source;
   a first reflector configured to reflect light from the first light source toward a front of the lamp;
   a second reflector configured to reflect light from the second light source toward the front of the lamp; and
   a first shade configured to shield at least a part of direct light directed from the first light source to an outside of the lamp,
   wherein the first shade includes a reflecting surface having a rotational paraboloid shape and configured to reflect the light from the second light source toward the front of the lamp.

2. The vehicle lamp of claim 1, wherein the reflecting surface is configured to reflect the light from the second light source in a direction that is substantially the same as the light from the first light source reflected by the first reflector.

3. The vehicle lamp of claim 2, further comprising a second shade configured to shield at least a part of direct light directed from the second light source to the outside of the lamp,
   wherein the second shade includes a reflecting surface configured to reflect the light from the first light source toward the front of the lamp.

4. The vehicle lamp of claim 1, wherein the rotational paraboloid shape has a focal point at or near the second light source.

5. The vehicle lamp of claim 4, further comprising a second shade configured to shield at least a part of direct light directed from the second light source to the outside of the lamp,
   wherein the second shade includes a reflecting surface configured to reflect the light from the first light source toward the front of the lamp.

6. The vehicle lamp of claim 1, further comprising:
   a second shade configured to shield at least a part of direct light directed from the second light source to the outside of the lamp,
   wherein the second shade includes a reflecting surface configured to reflect the light from the first light source toward the front of the lamp.

7. The vehicle lamp of claim 1, wherein the first light source and the second light source are disposed such that light exit surfaces thereof face each other, and
   wherein each of the first and second reflectors has a rotational paraboloid shape having a focal point at or near the first or second light source, and does not protrude to a lamp front side from the first or second light source.

8. The vehicle lamp of claim 1, wherein a front end portion of the first reflector and a front end portion of the second reflector are connected.

9. The vehicle lamp of claim 1, wherein the first light source faces the second light source such that an optical axis of the first light source is substantially parallel to an optical axis of the second light source.

10. The vehicle lamp of claim 1, wherein an optical axis of the first light source is not parallel to an optical axis of the second light source.

11. A vehicle lamp comprising:
    a first light source;
    a second light source;
    a first reflector configured to reflect light from the first light source toward a front of the lamp;
    a second reflector configured to reflect light from the second light source toward the front of the lamp; and
    a first shade configured to shield at least a part of direct light directed from the first light source to an outside of the lamp,
    a second shade configured to shield at least a part of direct light directed from the second light source to the outside of the lamp,
    wherein the first shade includes a reflecting surface configured to reflect the light from the second light source toward the front of the lamp and the second shade includes a reflecting surface configured to reflect the light from the first light source toward the front of the lamp.

12. The vehicle lamp of claim 11, wherein the reflecting surface has a rotational paraboloid shape having a focal point at or near the second light source.

13. The vehicle lamp of claim 11, wherein a front end portion of the first reflector and a front end portion of the second reflector are connected.

14. The vehicle lamp of claim 11, wherein the first light source faces the second light source such that an optical axis of the first light source is substantially parallel to an optical axis of the second light source.

15. The vehicle lamp of claim 11, wherein an optical axis of the first light source is not parallel to an optical axis of the second light source.

* * * * *